United States Patent [19]

Boudouris et al.

[11] 4,169,566
[45] * Oct. 2, 1979

[54] FILM SUPPLY AND TAKE-UP SYSTEM FOR MOTION PICTURE PROJECTOR

[75] Inventors: Angelo Boudouris, Sylvania; William D. Petty, Perrysburg; Clarence S. Simonds, Sylvania, all of Ohio

[73] Assignee: Eprad Incorporated, Toledo, Ohio

[*] Notice: The portion of the term of this patent subsequent to Mar. 8, 1994, has been disclaimed.

[21] Appl. No.: 770,522

[22] Filed: Feb. 22, 1977

Related U.S. Application Data

[63] Continuation-in-part of Ser. No. 617,520, Sep. 29, 1975, Pat. No. 4,010,910.

[51] Int. Cl.² .............. B65H 17/48; G03B 21/00
[52] U.S. Cl. .............. 242/55.18; 242/75.51; 352/128
[58] Field of Search .............. 242/55.18, 55.19 R, 242/75.51; 352/128, 126

[56] References Cited

U.S. PATENT DOCUMENTS

| | | | |
|---|---|---|---|
| 3,780,959 | 12/1973 | Burth | 242/55.18 |
| 3,823,890 | 7/1974 | Potts | 242/55.18 |
| 4,010,910 | 3/1977 | Boudouris et al. | 242/55.18 |

FOREIGN PATENT DOCUMENTS 1237893  10/1967  Fed. Rep. of Germany .... 242/55.19 R Primary Examiner—Billy S. Taylor
Attorney, Agent, or Firm—Oliver E. Todd, Jr.

[57] ABSTRACT

An improved film supply and take-up transport for use with a motion picture projector. At least two horizontal film platters are connected through bearing plates to a single vertical drive shaft. A circular film winding core is selectively positioned concentric with the shaft on one platter. The core engages a mechanism for locking the platter through the bearing plate to the drive shaft for operating the platter in a take-up mode. A motor is controlled to rotate the drive shaft for winding the film onto the core at the same rate that the film is advanced through the projector. Film is supplied to the projector from the center of a film coil on another platter which is coupled through its bearing plate to the drive shaft. An auxiliary motor is intermittently operated to initially accelerate the supply platter when the projector is first started and to control the supply platter speed to maintain a desired film supply rate.

6 Claims, 9 Drawing Figures

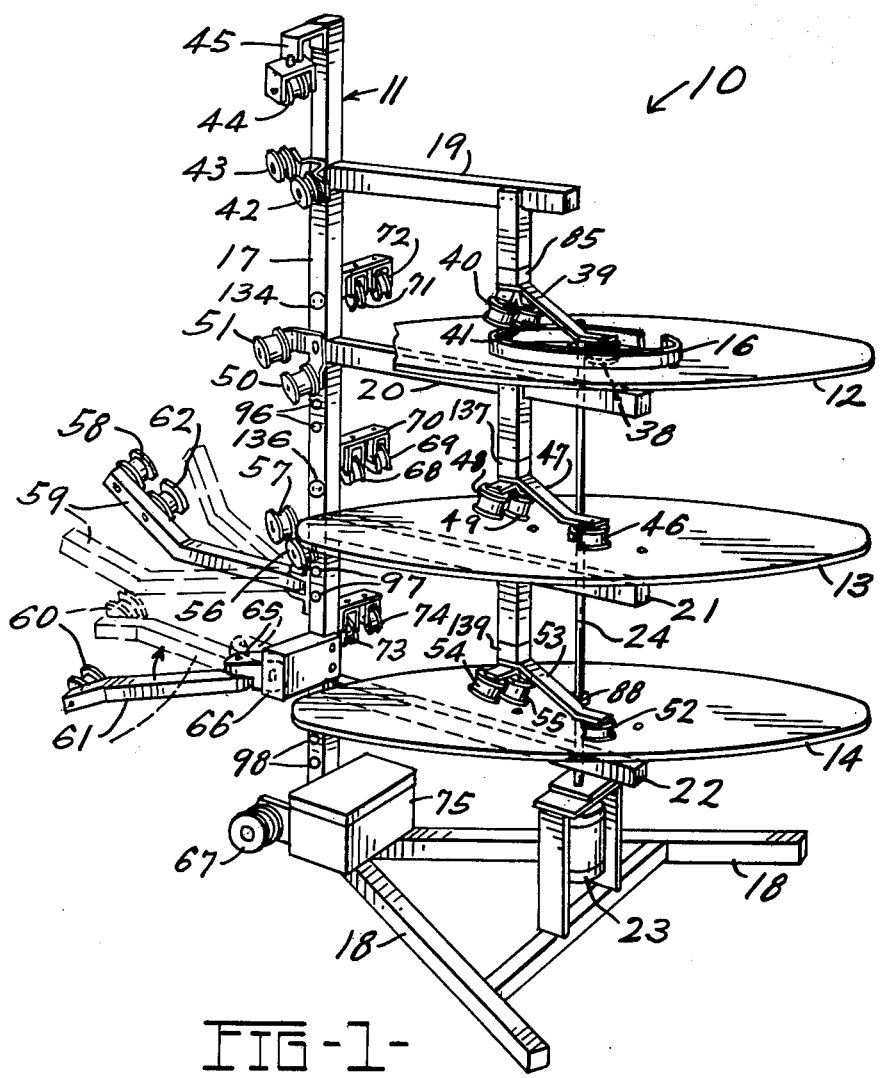
FIG-1-

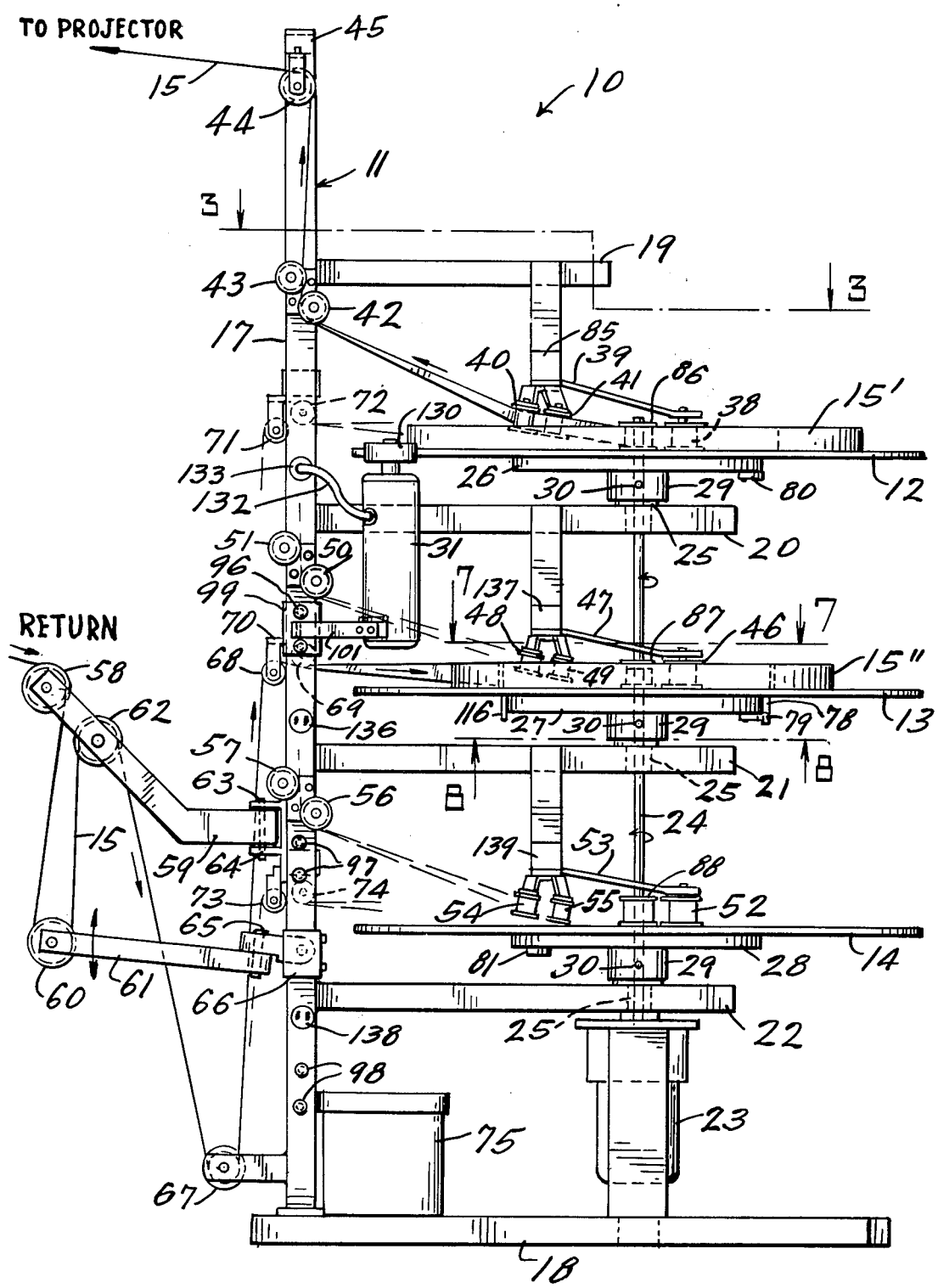

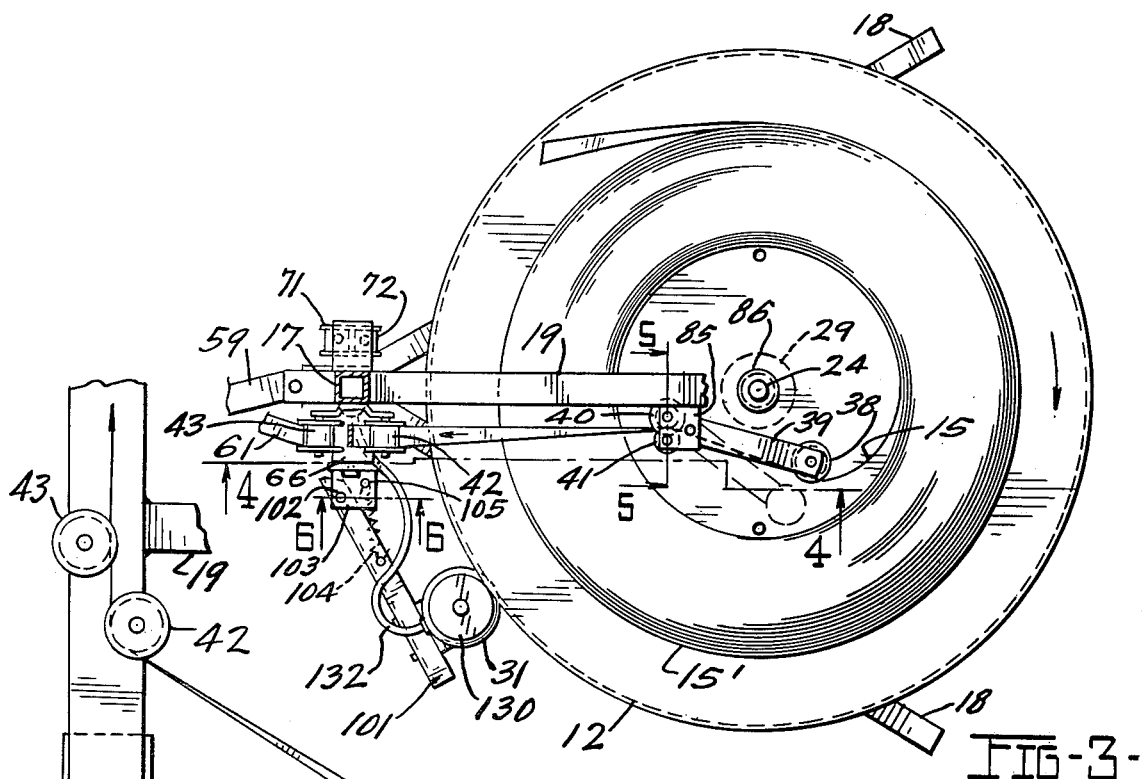
FIG-3-
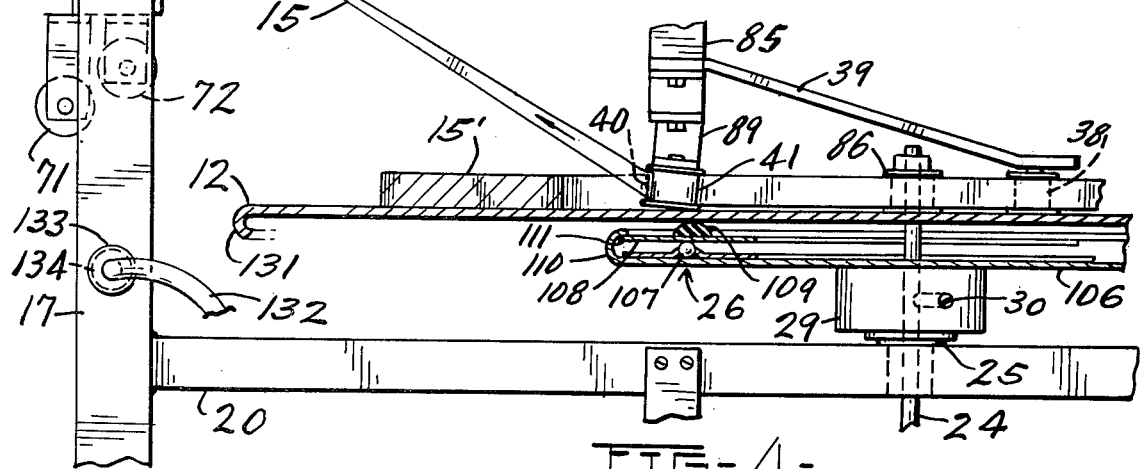
FIG-4-
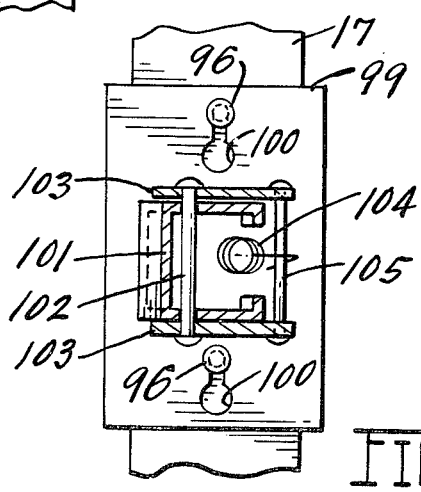
FIG-6-
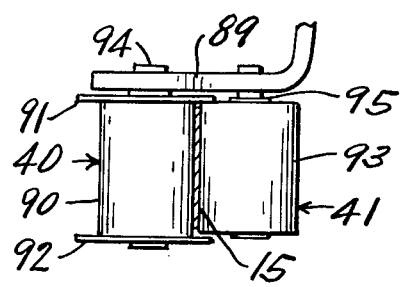
FIG-5-

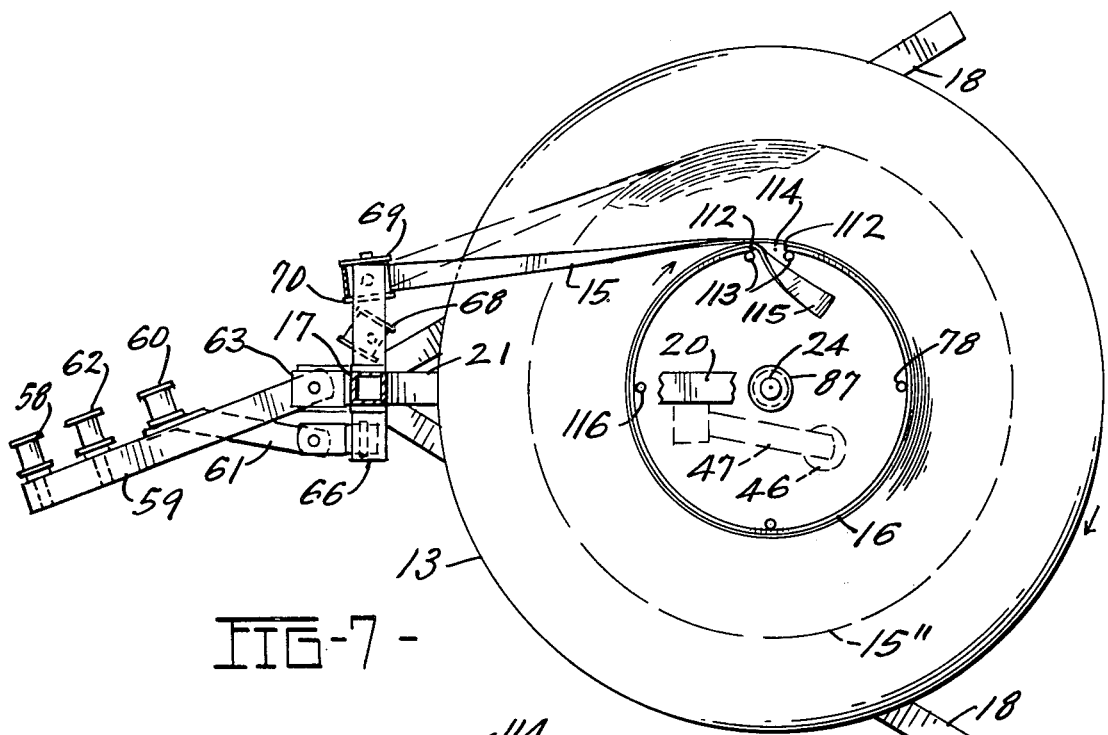
FIG-7-
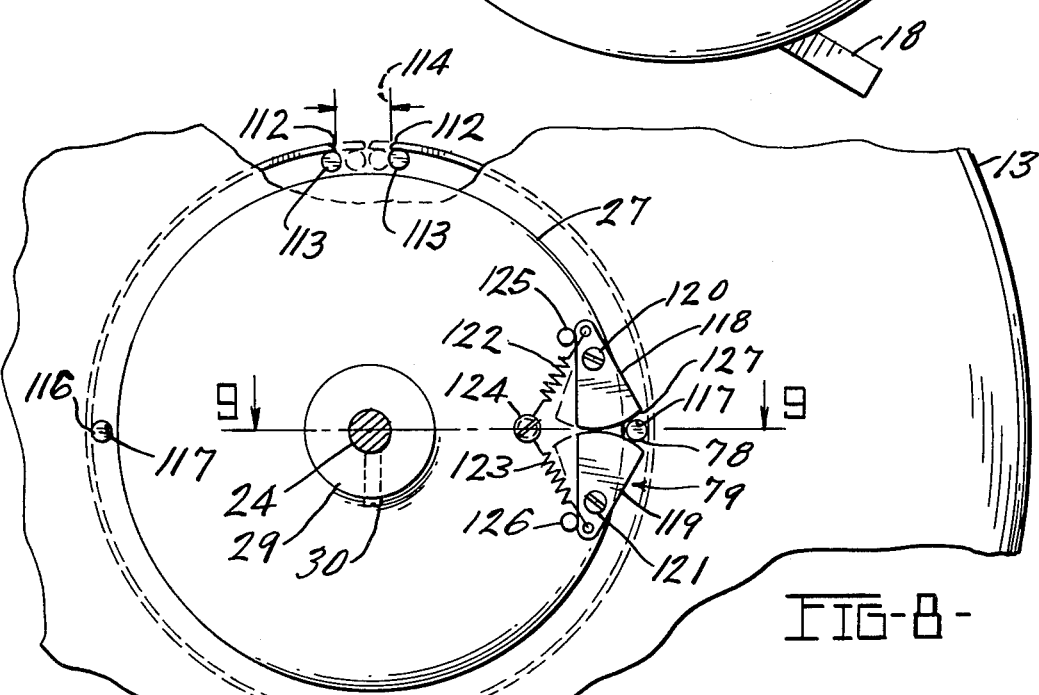
FIG-8-
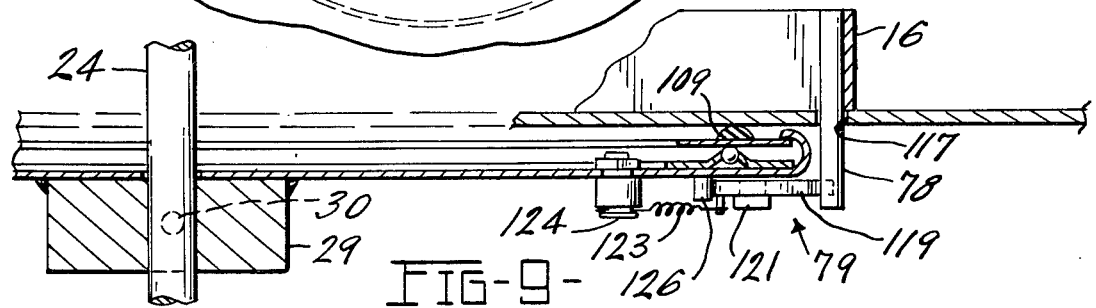
FIG-9-

FILM SUPPLY AND TAKE-UP SYSTEM FOR MOTION PICTURE PROJECTOR

CROSS-REFERENCE TO RELATED APPLICATION

This is a continuation-in-part of our copending United States patent application Ser. No. 617,520 filed Sept. 29, 1975, now U.S. Pat. No. 4,010,910.

BACKGROUND OF THE INVENTION

This invention relates to a motion picture film transport and more particularly to an improved film transport in which motion picture film is unwound from the center of a horizontal coil on a first platter and wound onto the exterior of a horizontal coil on a second platter.

Theater motion picture projectors are assembled from several different component parts. These parts include a projection head, a light source, a sound head and a film supply and take-up transport system. Film from a supply coil in the transport system is intermittently advanced past an aperture in the projection head, past the sound head and returned to a take-up coil in the transport system. Various types of film transports have been used in prior art motion picture theater projectors. The most common prior art film transport includes a film supply reel and a film take-up reel. The projection head pulls film from the supply reel at the rate required for normal projection, for example 90 feet per minute, and the take-up reel is driven to wind up the film after it leaves the projection head and the sound head. A system of this type has several disadvantages. The film wound onto the take-up reel is collected on the periphery of the reel so that at the end of the show, the film is in reverse order on the reel. Therefore, it is necessary for an operator to rewind the reel before the next showing. Because of the need for rewinding, two complete motion picture projection systems are needed for continuous operation of a theater. Films are normally shown in segments which are on the order of 20 to 30 minutes in length. While one segment is being shown, the operator rewinds the previously shown segment and then threads the next segment into the projector. With a system of this type, longer film segments are generally not practical since each film reel must be manually loaded and unloaded from the projector and commercial film has considerable weight. As a consequence, a projection room operator must normally be present during operation of a theater.

An improved prior art film transport system is shown in, for example, U.S. Pat. No. 3,661,337 which issued on May 9, 1972 and in U.S. Pat. No. 3,780,959 which issued on Dec. 25, 1973. These patents show a transport system including at least two horizontal platters. The film supply rests in a horizontal coil on a first one of the platters. As a motor rotates the platter, the film is unwound from the center of the coil and delivered to the projection head. The motor speed is varied to maintain a desired film supply rate. A second platter is provided with a core and is rotated by a second motor at a controlled speed for winding the film from the projection head about the core. The film is wound about the exterior of the core to form an increasing diameter coil. At the end of the show, the core is moved from the take-up platter to what was previously the supply platter or to another platter. The operating mode of the two platters then reverses. The second platter, which now carries the coil of film, becomes the supply platter and the film is removed from the center of the coil. A film transport system of this type has several advantages over a reel-type transport in that an entire film may be positioned on the transport system. This eliminates the need for changing reels during the show. Furthermore, since the film is removed from the center of the coil on the supply reel, the need for rewinding the film is eliminated. As a consequence, the projection room operator only need be present before the show for threading the film and starting the projector. However, prior art transport systems of the type using the horizontal platters have been complicated and expensive.

SUMMARY OF THE INVENTION

According to the present invention, an improved platter-type film transport system is provided for supplying film to and collecting film from a motion picture projector. The transport includes a single unidirectional motor which drives a vertical shaft at a controlled rotational speed. Two or more bearing plates are attached to the shaft and a separate platter rests on each bearing plate. The platter is free to turn on the bearing plate independently of the shaft, although it will normally tend to rotate with the shaft due to frictional forces in the bearing plate. One of the platters functions as a film source or supply and carries a coil of the film. The film is removed from the center of the coil and delivered to the projector. As the film is removed from the center of the coil, the size of the innermost film loop is sensed for controlling an auxiliary motor which either slows the platter to a speed below the speed of the driven shaft or accelerates the platter to a speed above that of the driven shaft. The auxiliary motor facilitates initial acceleration of the film supply platter when it carries a large mass of film and also permits using the transport system under circumstances wherein the inner diameter of the supply film coil differs substantially from the outer diameter of the take-up film coil. Film from the projector is collected on a second or take-up platter. A circular core is attached concentrically to the film take-up platter. When the core is attached to the platter, a locking mechanism connects the platter to the bearing plate so that the platter is rotated directly with the driven shaft. Film from the projector passes over a dancer arm which is positioned according to film tension and is wound on the core on the take-up platter. The position of the dancer arm adjusts a tap on an auto-transformer or adjusts a similar sensor which in turn controls the speed of the motor such that the take-up platter is rotated to wind up the film at the same average rate as the film is advanced through the projector.

Accordingly, it is an object of the invention to provide an improved transport for delivering film to and collecting film from the projection head and sound head in a motion picture projector.

Another object of the invention is to provide an improved platter-type film transport for a motion picture projector.

Other objects and advantages of the invention will become apparent from the following detailed description, with reference being made to the accompanying drawings.

BRIEF DESCRIPTION OF THE DRAWINGS

FIG. 1 is a perspective view of an improved platter-type film transport constructed in accordance with the present invention for use in a motion picture projection system;

FIG. 2 is a side elevational view of a platter-type film transport constructed in accordance with the present invention and showing film placement for a typical mode of operation;

FIG. 3 is a fragmentary cross-sectional view taken along line 3—3 of FIG. 2;

FIG. 4 is a fragmentary cross sectional view taken along line 4—4 of FIG. 3;

FIG. 5 is a cross sectional view taken along line 5—5 of FIG. 3;

FIG. 6 is a cross sectional view through the auxiliary motor support bracket taken along line 6—6 of FIG. 3;

FIG. 7 is a cross sectional view taken along line 7—7 of FIG. 2;

FIG. 8 is a fragmentary cross sectional view taken along line 8—8 of FIG. 2; and FIG. 9 is a fragmentary cross sectional view as taken along line 9—9 of FIG. 8.

DESCRIPTION OF THE PREFERRED EMBODIMENT

Turning now to the drawings and particularly to FIGS. 1 and 2, an improved film transport 10 is shown in detail for supplying film to and taking up film from a conventional motion picture projector (not shown) of the type used, for example, in movie theaters. The transport 10 includes a frame 11 which supports a plurality of driven discs or platters, of which three platters 12-14 are shown. In the exemplary embodiment shown in FIG. 2 with film 15, the platter 13 mounts a core 16 for functioning as a film take-up platter and the platter 14 functions as a spare platter. However, the operating modes of the platters 12-14 are interchangeable and each platter may function in either a supply or a take-up mode. For example, FIG. 1 shows the platter 12 mounting the core 16 for functioning as a film take-up platter.

The film 15 is initially positioned in a coil 15' on the supply platter 12 in the embodiment of FIG. 2. From the supply platter 12, the film is delivered to a projector including a projection head and a sound head. After the film is advanced through the projector, it is returned to the transport 10 wherein it is wound in a coil 15" about the core 16 attached to the take-up platter 13. After the entire film is wound upon the core 16 on the take-up platter 13, the core 16 is moved to either of the other platters 12 or 14, such as platter 12 as shown in FIG. 1. The platter 12 or 14 to which the core 16 is currently attached then becomes the film take-up platter and the platter 13 which at this time holds the film 15 becomes the supply platter. Thus, any one of the three platters 12-14 may at any time function as a film supply platter while any of the other two remaining platters 12-14 may function as a film take-up platter. The spare platter 14 in FIG. 2, or other platter currently functioning as a spare platter, may be used for holding film for a second show or for making up a new show. Normally, a show is received from a supplier on a number of reels which typically hold 20 to 30 minute film segments. During makeup, these segments are spliced together on one of the platters, such as the spare platter 14.

The frame 11 includes a generally vertical column 17 supported by two angled legs 18. Four arms 19-22 project horizontally from one side of the column 17. A motor 23 is mounted below and in vertical alignment with the arms 19-22. A vertical drive shaft 24 is connected to the motor 23 and extends upwardly through aligned bushings 25 in each of the arms 20-22. Three bearing plates 26-28 are positioned on the shaft 24 with one of the bearing plates 26-28 located above each of the arms 20-22, respectively. Each of the bearing plates 26-28 includes a collar 29 through which a set screw 30 is threaded for connecting the bearing plates 26-28 to the drive shaft 24. The platters 12-14 are concentric with the drive shaft 24 and rest upon the bearing plates 26-28, respectively. The bearing plates 26-28 couple the platters 12-14 to the drive shaft 24 through internal friction such that the platters 12-14 will tend to rotate with the drive shaft 24. However, the application of a braking force to any of the platters 12-14 will slow such platter below the speed of the drive shaft 24 and the application of an acceleration force will accelerate such platter above the speed of the drive shaft 24. An auxiliary motor 31 is removably attached to the column 17 adjacent the platter 12, 13 or 14 which functions as the film supply platter for applying acceleration and braking forces to such platter. The operation of the auxiliary motor 31 is discussed in greater detail below. The auxiliary motor 31 (omitted from FIG. 1) is shown engaging the film supply platter 12 in FIG. 2. In a modified embodiment, a separate auxiliary motor is provided for each of the platters 12-14 for use when such platters are operated in film supply modes.

A number of guide rollers or pulleys are provided adjacent to each of the platters 12-14 for guiding film to and from the platters 12-14. Since each of the platters 12-14 may function either in a film supply mode or in a film take-up mode, duplicate sets of pulleys must be provided for guiding film from and for supplying film to each platter.

As previously indicated, in the embodiment shown in FIG. 2, the platter 12 is functioning in a film supply mode. Initially, the entire film 15 rests in a coil 15' upon the platter 12. The film 15 is removed by unwinding from the center of the coil 15'. The loop at the center of the coil 15' passes around a pulley 38 mounted on a dancer arm 39 and between two guide pulleys 40 and 41. The pulleys 38, 40 and 41 are free to rotate on substantially vertical axes. From the pulleys 40 and 41, the film passes between a pair of horizontal pulleys 42 and 43 attached to the column 17 and over a pulley 44 attached at the top of the column 17. The film 15 twists 90° from a vertical plane to a horizontal plane as it moves from the pair of pulleys 40 and 41 to the pair of pulleys 42 and 43. From the pulley 44, the film passes to the projector (not shown), which, as previously indicated, may be of any conventional design. The pulley 44 is attached to the column 17 by a swivel mounting 45 which permits at least a limited degree of motion between the pulley 44 and the column 17 for alignment of the film with the projector. A similar set of pulleys is provided for the platter 13 when the platter 13 is used in a film supply mode. For the platter 13, the film 15 is unwound from the center of a coil and passes over a pulley 46 mounted on a dancer arm 47, and between a pair of vertically oriented guide pulleys 48 and 49. From the pulleys 48 and 49, the film twists 90° and passes between a pair of horizontal pulleys 50 and 51 on the column 17 and upwardly over the pulley 44 and thence to the projector. Similarly, when the platter 14 functions in a film supply mode, film is unwound from the center of a coil resting on the platter 14 and passes over a pulley 52 mounted on a dancer arm 53. From the pulley 52, the film passes between a pair of vertically mounted guide pulleys 54 and 55, twists 90° and passes between a pair of horizontally mounted pulleys 56 and 57 on the column 17. From the pulleys 56 and 57, the film passes upwardly and over the pulley 44 and thence to the projector.

The platter 13 is shown functioning in the film take-up mode in the embodiment of FIG. 2. From the projector, the film passes over a pulley 58 on an arm 59, over a pulley 60 on a dancer arm 61 and over a second pulley 62 on the arm 59. The arm 61 is attached to the column 17 by means of a vertical pivot pin 63 on a bracket 64. The pin 63 permits rotation of the arm 59 about a vertical axis for alignment of the pulley 58 with the projector. The arm 61 also includes a hinge 65 to permit alignment of the pulley 60 below the pulleys 58 and 62. The arm 61 is connected to the shaft of a signal generating device 66, such as a variable tap auto-transformer, a Variac, a variable resistor, etc. Gravity tends to pull the arm 61 down while the loop of the film 15 extending between the pulleys 58, 60 and 62 raises the arm 61. The vertical position of the arm 61, which is determined by the size of the film loop, determines the output signal from the device 66 for controlling the speed of the motor 23. From the pulley 62, the film 15 passes over an idler pulley 67 mounted adjacent the base of the column 17. From the idler pulley 67, the film 15 passes upwardly and over a pulley 68 attached to the column 17. The pulley 68 is attached to the column 17 by means of two brackets 70 and 70' which permit rotation of the pulley 68 about a horizontal axis and also about a vertical axis for alignment with the changing periphery of a coil 15" of the film 15 on the platter 13. The bracket 70' is fixed to and extends horizontally from the column 17. The bracket 70 is generally U-shaped and is pivotally attached to the bracket 70' by a vertical pin 70". From the pulley 68, the film twists 90° and is wound about the core 16 which is attached to the platter 13.

Similar pulleys are mounted on the column 17 adjacent the platters 12 and 14. When the core 16 is positioned on the platter 12 so that the platter 12 is operated in a film take-up mode, as shown in FIG. 1, film passes from the idler pulley 67 over a pulley 71 and is wound onto the core 16 on the platter 12. Similarly, when the platter 14 functions in a film take-up mode, the film 15 passes from the idler pulley 67 over a pulley 73 and onto the platter 14. Thus, through selection of the pulleys guiding the film 15, each of the three platters 12–14 may be used either in a film supply mode or in a film take-up mode.

As indicated above, the speed of the motor 23 is determined by the position of the dancer arm 61 which controls the output from the device 66. The control signal from the device 66 passes into a control 75 which, in a conventional manner, controls the speed of the motor 23 in response to the signal from the device 66. The three bearing plates 26–28 are, therefore, rotated with the drive shaft 24 at a speed determined by the position of the dancer arm 61 or, in effect, the tension or length in the film 15 between the projector and the film transport 10 which in turn determines the size of the film loop between the pulleys 58, 60 and 62.

As will be discussed in greater detail below, when the core 16 is positioned on the platter 13, as shown in FIG. 2, or on one of the other platters, a pin 78 projects through the platter 13 and engages a lock 79 on the bearing plate 27. Similar locks 80 and 81 are mounted, respectively, on the bearing plates 26 and 28. The pin 78 and the lock 79 cooperate to prevent rotation between the platter 13 and the bearing plate 27. Therefore, the platter 13 is rotated directly with the drive shaft 24 for winding the film 15 in a coil 15" about the core 16 at a speed determined by the position of the dancer arm 61. As the diameter of the coil 15" increases, the rotational speed is decreased to maintain a constant film speed, as is required by the projector through which the film 15 passes.

Since the film coil 15' on the supply platter 12 was originally wound upon the core 16 which is shown on the take-up platter 13, the internal diameter of the coil of film 15 on the supply platter 12 will initially be the same as the external diameter of the film coil on the take-up platter 13 under normal operation of the transport 10. When film is initially removed from the inside of the film supply coil 15' on the supply platter 12 for threading over the pulleys 40, 41, 42, 43, 44, through the projector and the return guide pulleys leading to the take-up platter 13, the diameter of the coil of film 15 on the supply platter 12 will be larger than the diameter of the coil of film on the take-up platter 13. Therefore, it normally is necessary to run the platter 12 at a slower speed than the platter 13. When the motor 23 is started, insufficient force is transmitted through the bearing plate 26 to start rotating the supply platter 12 at the speed of the shaft 24 due to braking forces from the auxiliary motor 31 and the large mass of the film coil 15'. By energizing the auxiliary motor 31, the platter 12 will rapidly accelerate to the speed of the shaft 24, even though a high inertia exists from the mass of the film coil 15' which may exceed 100 pounds.

As previously indicated, the film from the center of the coil of film 15 initially passes over the pulley 38 on the arm 39. The dancer arm 39 is mounted to pivot and is spring loaded to bias the pulley 38 against the film 15. If the size of the innermost film loop at the center of the coil 15' exceeds a predetermined dimension, the arm 39 moves to open a switch 85 which deactivates the auxiliary motor 31 to gradually slow down or brake the platter 12 from internal frictional forces in the motor 31. When the supply platter 12 rotates too slow and the tension in the loop of film 15 across the pulley 38 increases to move the arm 39 to a predetermined point, the switch 85 closes and the auxiliary motor 31 is energized to increase the speed of the platter 12. There will be some fluctuation or hunting in the speed of the film supply platter 12 as the switch 85 alternately opens and closes. However, this fluctuation is greatly damped due to the mass of the film coil 15' and the mass of the platter 12.

Turning now to FIGS. 3 and 4, enlarged fragmentary views are shown for the platter 12 and related structure for operating the platter 12 in the film supply mode. As best seen in FIG. 3, the dancer arm 39 carrying the pulley 38 pivots from the switch 85 toward and away from the shaft 24 for closing and opening the switch 85. The switch 85 may be a conventional single pole single throw switch which is either opened or closed, depending upon the position of the dancer arm 39. Normally, the film 15 is unwound from the center of the coil 15' and passes over the pulley 38 and between the pulleys 40 and 41 as shown in solid in FIG. 3. An internal spring in the switch 85 tends to bias the arm 39 towards the position shown in dashed lines in FIG. 3. If the film unwinds from the center of the coil 15' at a rate faster than the average rate in which the film is advanced through the projector, the arm 39 will move to the position shown in dashed lines. When the arm 39 moves to this position, the switch 85 is opened to de-energize the auxiliary motor 31, thereby causing the platter 12 to gradually slow down. When the arm 39 is pulled by the film 15 back to the position shown in solid in FIG. 3, the switch 85 is again closed to energize the auxiliary motor 31. Although there will be some fluctuation or hunting in the speed of the film supply platter 12, the average speed is maintained at the necessary level to supply film at the rate required by the projector. The fluctuations in platter speed are greatly damped by the mass of the platter 12 and the film coil 15'.

A pulley 86 is positioned on the shaft 24 to rest on the platter 12. If the inner loops of film 15 should become tight, the film 15 will pass over the pulley 86 rather than bending around the shaft 24. Similar pulleys 87 and 88 are provided on the shaft 24 to rest upon the platters 13 and 14 respectively, see FIG. 2, for protecting the film when the platters 13 and 14 are operated in a film supply mode. Normally, the film loop will pass over the pulley 38 on the dancer arm 39 and between the pulleys 40 and 41 without contacting the pulley 86. Details of the pulleys 40 and 41 are shown in FIG. 5. The pulleys 40 and 41 are supported on a bracket 89 which is mounted on the upper arm 19. The pulley 40 includes a generally cylindrical body 90 with upper and lower flanges 91 and 92, respectively. The pulley 41 merely consists of a generally cylindrical body 93 which fits between the flanges 91 and 92 and the pulley 40. When the film 15 is passed between the pulleys 40 and 41, it is restricted from movement in a vertical direction by the flanges 91 and 92.

Turning now to FIGS. 2, 3, and 6, details are shown for the auxiliary motor 31 and its related support structure. A pair of bolts 96 projects from the column 17 adjacent the arm 20, a second pair of bolts 97 projects from the column 17 adjacent the arm 21 and a third pair of bolts 98 projects from the column 17 adjacent the arm 22. A bracket 99 releasably engages any selected pair of the bolts 96, 97 or 98 for mounting the auxiliary motor 31 adjacent the platter 12, 13 or 14 which is currently functioning as a film supply platter. The bracket 99 releasably engages any pair of the bolts 96-98 by any convenient means, as by a pair of key hole shaped openings 100 spaced to receive the two bolts in a pair of bolts 96, 97 or 98. A motor support arm 101 is mounted on a pivot pin 102 which extends between two parallel flanges 103 projecting from the bracket 99. A tension spring 104 is located within and anchored at one end to the arm 101 and anchored at an opposite end to a pin 105 which also extends between the spaced flanges 103. The spring 104 urges the arm 101 towards the film supply platter 12 so that a capstan or drive wheel 130 attached to the motor 31 engages a rim 131 on the platter 12. A power cord 132 for the motor 31 terminates at a plug 133 which engages a socket 134 on the column 17. The socket 134 is connected through a wire extending through the column 17 and the arm 19 to the switch 85 and also through the column 17 to the power supply 75. The switch 85 controls power supplied to the outlet or connector 134 for controlling the auxiliary motor 31 to drive or break the film supply platter 12, as determined by the position of the dancer arm 39. A similar socket 136 is located adjacent the arm 21 and is connected through the arm 20 to a switch 137 which is controlled by the dancer arm 47 and a third socket 138 located adjacent the arm 22 is connected through the arm 21 to a switch 139 controlled by the dancer arm 53. When the platter 13 is operated as a film supply platter, the auxiliary motor 31 is mounted from the pair of bolts 97 and the plug 133 is attached to the connector 136 for controlling the auxiliary motor 31 in response to the position of the dancer arm 47. Similarly, when the platter 14 is operated as a film supply platter, the auxiliary motor 31 is attached to the bolts 98 on the column 17 and the plug 133 is attached to the connector or socket 138. The auxiliary motor 31 is then controlled by the position of the dancer arm 53 which controls the switch 139.

In a modified embodiment of the invention, the single auxiliary motor 31 may be replaced with three identical auxiliary motors with a different one mounted to drive each of the platters 12, 13 and 14. Only the auxiliary motor for the platter 12, 13 or 14 operated as a film supply platter will be engaged and the others will be disengaged from their associated platter. However, it should be appreciated that this embodiment involves considerably more expense since three separate auxiliary motors are used in place of a single auxiliary motor, as shown in the drawings.

FIG. 4 shows construction details for the bearing plate 26. As previously indicated, the bearing plate 26 includes a collar 29 which is attached to the shaft 24 by means of a set screw 30. The collar 29 is connected to a flat rigid plate 106 which supports the weight of the platter 12 and any film on the platter 12. An annular bearing race 107 is attached to the plate 106 concentric with the shaft 24. A flat annular plate 108 rests upon the bearing race 107 and is rotatable with respect to the plate 106. The platter 12 rests upon a rubber ring 109 attached to the plate 108 above the bearing race 107. The outer periphery 110 of the plate 106 is rolled over the outer edge 111 of the plate 108 for retaining the plates 108 and 106 together. Through the action of the bearing 107, the platter 12 may be rotated at a speed different from the speed of the plate 106 as the bearing plate 26 is rotated with the shaft 24. However, sufficient forces are coupled through the bearing plate 26 by friction as to tend to rotate the platter 12 with the drive shaft 24.

Turning now to FIGS. 7-9, details are shown for the platter 13 and related structure as the platter 13 is operated in a film take-up mode. The core 16 consists of a flat metal band formed into a ring or circle and having spaced ends 112. Short metal rods 113 are attached to the ends 112 to define a slot 114 for receiving an end 115 of the film 15. The core 16 also includes the pin 78 and a pin 116 which extend through two holes 117 through the platter 13. The holes 117 lie on opposite sides of the shaft 24 and are spaced apart by a distance slightly greater than the diameter of the bearing plate 27. The pins 78 and 116 center and firmly hold the core 16 on the platter 13. One of the pins, pin 78 shown, also functions to engage the lock 79 for connecting the platter 13 to the bearing plate 27.

As best seen in FIGS. 8 and 9, the lock 79 is mounted on the bottom of the bearing plate 27. The lock 79 includes a pair of blades 118 and 119. A shoulder screw 120 attaches the blade 118 to the bottom of the bearing plate 27 for limited rotational movement about the screw 120. Similarly, a shoulder screw 121 attaches the blade 119 to the bottom of the bearing plate 27 for limited rotational movement. Springs 122 and 123 are connected from a screw 124 to the blades 120 and 121, respectively, for urging the blades 118 and 119 against stops 125 and 126, respectively. When the core 16 is attached to the platter 13, the pins 78 and 116 pass through the holes 117 in the platter 13 and project below the bearing plate 27. Subsequent rotation between the platter 13 and the bearing plate 27 causes one of the pins 78 or 116 to deflect one of the blades 118 or 119 until such pin snaps into a notch 127 between the blades 118 and 119. The deflected blade 118 or 119 then snaps back to its original position to lock the platter 13 and the bearing plate 27 together. Subsequent removal of the core 16 from the platter 13 releases the lock to permit relative rotation between the platter 13 and the bearing plate 27. Similar locking arrangements are provided on the bearing plates 26 and 28 for cooperating with the core 16 when it is attached to either the platter 12 or the platter 14.

By using the auxiliary motor 31 for driving the film supply platter, the transport 10 may be easily operated under conditions wherein the coil of film on the film supply platter has a significantly different internal diameter than the external diameter on the coil on the film take-up platter. This condition could occur, for example, where two separate platters carry different movies which are to be combined on a single take-up platter. After a first of the movies or shows is projected and wound onto the take-up platter, the films are spliced together and the second show is then wound on the take-up platter around the exterior of the first show. As a consequence, there will be an appreciable difference in the interior film coil diameter on the current film supply platter and the exterior film coil diameter on the film take-up platter. The motor 23 will then operate to maintain the speed of the film take-up platter for taking up film at the same average speed at which it is advanced through the projector and the auxiliary motor 31 will operate to maintain the speed of the current film supply platter to supply film at the same average speed at which film is advanced through the projector. Another example in which the platters may operate at appreciably different speeds occurs where two films spliced together on a single platter are to be separated and placed on two separate take-up platters so that one film may be taken down and placed upon shipping reels while the second film continues to be shown at the theater. In this case, the film is wound from the supply platter through the projector onto one of the take-up platters until the first show is completed. The film is then cut and the second show is wound upon a second take-up platter. Under these conditions, the interior film coil diameter on the film supply platter is appreciably larger than the exterior film diameter on the second film take-up platter. Again, the auxiliary motor 31 functions to maintain the speed of the film supply platter while the main motor 23 functions to control the speed of the current film take-up platter to maintain the average film speed the same as that required by the projector.

From the above description of a preferred embodiment of the invention, it will be seen that the transport 10 of the present invention functions to drive two or more platters from a single drive shaft 24 rotated by a single motor 23. When a core 16 is attached to one of the platters, such platter functions in a film take-up mode for winding the film about the core at the same rotational speed at which the motor 23 rotates the drive shaft 24. The motor speed is controlled such that the film is wound upon the core 16 at the same rate in which it is advanced through the projector. Film is supplied to the projector from another of the platters which carries the film wound in a coil concentric with the axis of the drive shaft 24. As the film is unwound from the center of the coil and supplied to a projector, an auxiliary motor alternately drives and brakes the platter to maintain an average unwinding speed the same as the speed at which the film is advanced through the projector. Thus, a low-cost, simplified platter-type transport is provided for supplying film to and for taking up film from a motion picture projector of the type used in commerical movie theaters.

It will be appreciated that various modifications and changes may be made to the above-described film transport without departing from the spirit and the scope of the claimed invention.

What we claim is:

1. In a motion picture projection system, an improved film transport for supplying film to a projector through which the film is advanced and for taking up film from the projector comprising, in combination, a drive shaft, motor means for rotating said drive shaft at a controlled speed, at least two platter means for carrying coils of film, either one of said platter means selectively functioning as a film take-up platter means for winding a coil of film from the projector and the other of said platter means functioning as a film supply platter means for supplying film to the projector, means for coupling driving power from said rotating drive shaft to both said film take-up platter means and said film supply platter means, means for controlling the rotational speed of said drive shaft for driving said take-up platter means to wind film at the same average rate that such film is advanced through the projector and auxiliary motor means for controlling the speed of said film supply platter means for supplying film at the same average rate that such film is advanced through the projector.

2. An improved film supply and take-up transport, as set forth in claim 1, wherein film is supplied to the projector from the center of a coil of film on said film supply platter means, and further including switch means responsive to the size of the innermost film loop of such coil on said film supply platter means for energizing said auxiliary motor means when such film loop is smaller than a predetermined size and for de-energizing said auxiliary motor means when such film loop is larger than a predetermined size.

3. An improved film supply and take-up transport, as set forth in claim 2, and further including means mounting said auxiliary motor means for selectively driving any one of said platter means when such platter means functions as a film supply platter means.

4. An improved film supply and take-up transport, as set forth in claim 1, wherein, when energized, said auxiliary motor means increases the speed of said film supply platter means to supply film at a rate faster than the average rate that such film is advanced through the projector and, when de-energized, said auxiliary motor means brakes said film supply platter means to supply film at a rate slower than the average rate that such film is advanced through the projector, and further including means for energizing and de-energizing said auxiliary motor means to maintain the average rate at which film is supplied from said film supplying platter means at the average rate that such film is advanced through the projector.

5. In a motion picture projection system, an improved film transport for supplying film to a projector through which the film is advanced and for taking up film from the projector comprising, in combination, a drive shaft, motor means for rotating said drive shaft at a controlled speed, at least two platter means for carrying coils of film, means for rotationally driving each of said platter means from said drive shaft, a film winding core, means for selectively attaching said core to either of said platter means concentric with the axis of rotation of such attached platter means, said core and attached platter means functioning as a film take-up platter means for winding a coil of film from the projector about said core and another of said platter means functioning as film supply platter means for supplying film from the center of a film coil to the projector, means for controlling the rotational speed of said drive shaft for driving said take-up platter means to wind film about said core at the same average rate that such film is advanced through the projector, and auxiliary motor means for controlling the average speed of said film supplying platter means for supplying film from the center of a film coil on said film supplying platter means at the same average rate that such film is advanced through the projector.

6. An improved film supply and take-up transport, as set forth in claim 5, wherein, when energized, said auxiliary motor means increases the speed of said film supply platter means to supply film at a rate faster than the average rate that such film is advanced through the projector, and, when de-energized, said auxiliary motor means brakes said film supply platter means to supply film at a rate slower than the average rate that such film is advanced through the projector, and further including means for energizing and de-energizing said auxiliary motor means to maintain the average rate at which film is supplied from said film supplying platter means at the average rate that such film is advanced through the projector.

* * * * *